United States Patent
Puffer et al.

(10) Patent No.: US 9,771,492 B2
(45) Date of Patent: Sep. 26, 2017

(54) THERMOPLASTIC PAVEMENT MARKING COMPOSITION AND METHOD

(71) Applicants: Daniel John Puffer, Madisonville, LA (US); Lam Thanh Nguyen, Harvey, LA (US)

(72) Inventors: Daniel John Puffer, Madisonville, LA (US); Lam Thanh Nguyen, Harvey, LA (US)

( * ) Notice: Subject to any disclaimer, the term of this patent is extended or adjusted under 35 U.S.C. 154(b) by 248 days.

(21) Appl. No.: 14/339,023

(22) Filed: Jul. 23, 2014

(65) Prior Publication Data

US 2016/0024338 A1    Jan. 28, 2016

(51) Int. Cl.
| | | |
|---|---|---|
| *C09D 191/00* | (2006.01) | |
| *C09D 167/08* | (2006.01) | |
| *C09D 193/04* | (2006.01) | |
| *C09D 191/06* | (2006.01) | |
| *C09D 5/33* | (2006.01) | |

(52) U.S. Cl.
CPC ........... *C09D 167/08* (2013.01); *C09D 5/004* (2013.01); *C09D 191/00* (2013.01); *C09D 191/06* (2013.01); *C09D 193/04* (2013.01)

(58) Field of Classification Search
CPC ..... C09D 5/004; C09D 191/06; C09D 193/04
USPC ........................................................ 523/172
See application file for complete search history.

(56) References Cited

U.S. PATENT DOCUMENTS

| | | | |
|---|---|---|---|
| 5,928,716 A | 7/1999 | Finley | |
| 5,972,421 A | 10/1999 | Finley | |
| 6,552,110 B1 * | 4/2003 | Yalvac | C08K 3/0008 523/172 |
| 6,679,650 B2 * | 1/2004 | Britt | E01F 9/042 404/12 |
| 2011/0123770 A1 * | 5/2011 | Greer | E01F 9/512 428/143 |
| 2012/0053278 A1 * | 3/2012 | Malucelli | B29B 9/16 524/400 |
| 2014/0272331 A1 * | 9/2014 | Teng | E01F 9/041 428/200 |
| 2016/0376467 A1 * | 12/2016 | Puffer, Sr. | C09D 193/04 523/172 |

FOREIGN PATENT DOCUMENTS

WO    WO9738835 A1    10/1997

OTHER PUBLICATIONS

Escorez Tackifiers datasheet, Exxon/Mobil. No date available.*

* cited by examiner

*Primary Examiner* — Edward Cain
(74) *Attorney, Agent, or Firm* — Keaty Law Firm, LLC

(57) ABSTRACT

A composition of matter suitable for use as a road marking substance and a method thereof provides for the steps of mixing a binder mixture with a filler mixture, heating the mixed ingredients while mixing into a homogenous molten mixture and then extruding the molten mixture. The extruded material is cooled, cut into individual pellets, coated with an anti-clumping coating and packaged for use in making a road marking substance in situ. The binder can be alkyd-based or hydrocarbon based. The binder includes rosin resins, wax and a plasticizer, and a hydrocarbon resin is added for the hydrocarbon-based binder. The filler contains titanium dioxide, a pigment (if necessary) and ground calcium carbonate.

23 Claims, 1 Drawing Sheet

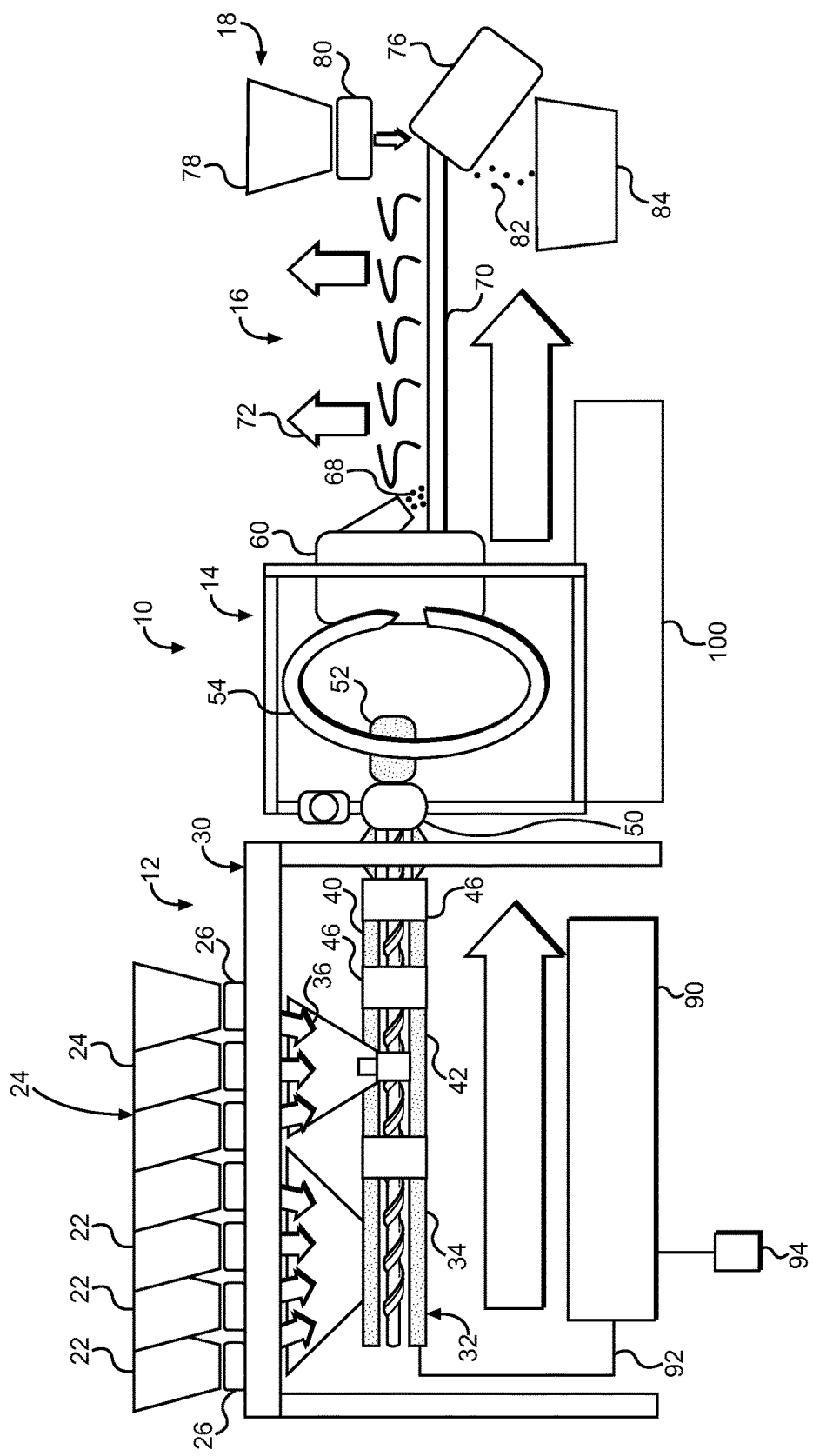

THERMOPLASTIC PAVEMENT MARKING COMPOSITION AND METHOD

CROSS-REFERENCE TO RELATED APPLICATIONS

This application is a continuation-in-part of my co-pending application Ser. No. 14/329,462 filed on Jul. 11, 2014, entitled "Pelletizing system for thermoplastic pavement marking material," which is a continuation-in-part of my co-pending application Ser. No. 14/270,068 filed on May 5, 2014 entitled "Pelletizing system for road surface marking material," the full disclosures of which are incorporated by reference herein and priority of which is hereby claimed.

BACKGROUND OF THE INVENTION

Road surface markings are used on paved roadways to provide guidance and information to drivers and pedestrians. Road surface markings can be formed using mechanical or non-mechanical devices. Mechanical road surface markers may be raised or recessed into the road surface, and can be either reflective or non-reflective. Examples of mechanical markers are Botts' dots and rumble strips. Non-mechanical markers may be formed by paint, thermoplastic, preformed polymer tape, epoxy and other methods.

Thermoplastic markers are some of the most common types of road marking based on their balance between cost and performance longevity. Thermoplastic binder systems are generally based on one of three core chemistries: hydrocarbons, rosin esters, and maleic modified rosin esters (MMRE). Thermoplastic coatings are generally homogeneous dry mixes of binder resins, plasticizers, glass beads (or other optics), pigments, and fillers. These types of markers demonstrate increased durability, lasting 3 to 6 years, and retro-reflectivity.

Thermoplastic pavement markings are used in a hot-melt application process for various types of traffic control indicia. They are normally comprised of alkyd or hydrocarbon based resin systems, although hybrid versions of the materials can be formulated to impart favorable properties of each individual system into one combined system. Typically, thermoplastic pavement marking materials are used on roadways in longitudinal lines as edge and center-lines either as a continuous line or a skipped/dashed line. They can also be used for transverse markings such as stop bars, chevrons, traffic taming markings, bike and pedestrian crossings, railroad crossings, or similar markings. Thermoplastic pavement markings are used on public and private highways, public and private properties, airports, and parking lots.

Thermoplastic pavement are non-reactive coatings systems that are 100% solids materials composed of binder, pigment, glass beads, and inert fillers. Each state, and some cities and counties, govern the type and application of thermoplastic application by specifying the chemical composition and final film properties in terms of field performance over the lifecycle of the marking. Although most governmental agencies have their own internal and independent pavement marking specifications, thermoplastic pavement marking specifications are normally based on some variation of AASHTO M-249, which is a federal specification that sets minimum and basic requirements of the materials to be used. The binder is made up of a combination of rosin or petroleum based resins, plasticizing oils, elastomers, and viscosity and flow modifiers. The pigment for white materials is predominately Type II rutile titanium dioxide. The pigment for yellow materials is an organic based yellow pigment which can be a combination of yellow and red or orange pigments designed to withstand high temperatures and provide excellent UV resistance and weatherability. Glass beads are incorporated into the material so that as the material degrades under UV, water, and traffic exposure the glass beads will become exposed and serve as reflective elements for nighttime visibility while under illumination from vehicles' headlamps. An exemplary compositional range for each component is as follows: binder 18-26%, pigment (TiO2 only) 10-12% for white, N/A for yellow, and beads 30-40%.

Conventional thermoplastic mix is supplied in powdered form, which makes it difficult to load into the road marking machine. The technicians have to strictly follow safety regulations and use special equipment when preparing the marking mix. My co-pending application Ser. No. 14/329,462 filed on Jul. 11, 2014 discloses a system of producing pelletized thermoplastic pavement marking material, which eliminates or significantly minimizes hazards associated with dust produced by powdered mixes. This application is directed to an apparatus and method of producing the thermoplastic pavement marking material in a pelletized form.

SUMMARY OF THE INVENTION

It is, therefore, an object of the present invention to provide an apparatus and method of making a pelletizing material that can be used for creating thermoplastic pavement markers.

It is another object of the invention to provide a pelletizing system capable of pelletizing a mixture of raw materials with embedded reflective elements.

It is a further object of the invention to provide a composition and method of producing pelletized road marking material, while mixing the powdered materials with reflective elements.

These and other objects of the invention are achieved through a provision of a composition of matter suitable for use as a road marking substance and a method thereof provides for the steps of mixing a binder mixture with a filler mixture, heating the mixed ingredients while mixing into a homogenous molten mixture and then extruding the molten mixture. The extruded material is cooled, cut into individual pellets, coated with an anti-clumping coating and packaged for use in making a road marking substance in situ. The binder can be alkyd-based or hydrocarbon based. The binder includes rosin resins, wax and a plasticizer, and a hydrocarbon resin is added for the hydrocarbon-based binder. The filler contains titanium dioxide, a pigment (if necessary) and ground calcium carbonate.

BRIEF DESCRIPTION OF THE DRAWINGS

Reference will now be made to the drawings, wherein like parts are designated by like numerals, and wherein FIG. 1 is a schematic view of the pelletizing system of the present invention.

DETAIL DESCRIPTION OF THE INVENTION

Turning now to the drawing in more detail, numeral 10 designates the pelletizing system of the present invention. The system 10 includes a mixing station 12, a cooling station 14, a drying station 16, and a pellet-coating station 18.

The mixing station 12 comprises a plurality of separate containers 22, each of which is configured to retain a pre-determined quantity of starting raw material, from which the pellets for the pavement marking are manufactured. The containers 22 are made as hoppers with open tops allowing the operators to deposit the raw materials therein. Raw materials are maintained in the storage hoppers 22 and gravity fed to a weight load cell 26, which accurately delivers raw materials in the desired weight proportion. In the exemplary embodiment of FIG. 1, each container or storage hopper 22 is provided with an individual loss in weight load cell 26. However that number can vary up or down depending on the number of components needed for the desired end product. The raw materials can be added in a liquid, solid, powder, or paste form; resins can be bought in liquid bulk containers eliminating paper, plastic, and pallet packaging.

In general, thermoplastic pavement marking materials are designed to impart compositional and physical properties outlined in Federal Specification AASHTO M249, but the material formulation can be modified to meet any applicable governmental agencies material requirements. AASHTO T250 test methods are used to determine material composition and physical characteristics.

Thermoplastic materials are typically based on hydrocarbon or alkyd resins. Materials produced using hydrocarbon based resins are used in long-line or longitudinal applications, whereas alkyd formulations can be used in any application. The alkyd-based composition of the thermoplastic marking material of the instant invention comprises a binder, pigment, glass beads, and fillers.

Alkyd based thermoplastic binders are comprised of a combination of one or more member selected from the group consisting of rosin resins, waxes, and plasticizers. More specifically, the rosin resin is comprised of one or more member of the group consisting of modified rosin resins and rosin esters. Modified rosin resins are comprised of one or more component of the group consisting of rosin acids, maleic anhydride, and fumaric acid. Rosin acids, derived from pine trees as gum rosin, wood rosin, or tall oil rosin, are comprised of one or more component of the group consisting of abeitic acid, neoabeitic acid, dehydroabeitic acid, levopimaric acid, pimaric acid, palustric acid, isopimaric acid, and sandarocopimaric acid. Rosin esters are comprised of one or more derivative obtained from the reaction of one or more rosin acids and one or more alcohol from the group of alcohols consisting of methanol, triethylene glycol, glycerol, and pentaerythritol.

The waxes are comprised of one or more member selected from the group consisting of vegetable waxes, petroleum derived waxes, and synthetic waxes. Vegetable waxes used in thermoplastics are normally naturally occurring mixtures of long-chain aliphatic hydrocarbons, containing esters of fatty acids and alcohols. The fatty acids are comprised of one or more component of the group consisting of ricinoleic acid, oleic acid, linoleic acid, linolenic acid, stearic acid, palmitic acid, dihydroxy stearic acid, myristic acid, myristoleic acid, palmitoleic acid, sapeinic acid, elaidic acid, vaccenic acid, alpha-linolenic acid, arachidonic acid, eicosapentaenoic acid, erucic acid, docosahexaenoic acid, caprylic acid, capric acid, lauric acid, arachidic acid, behenic acid, lignoceric acid, and cerotic acid.

The alcohols are comprised of one or more members selected from the group consisting of glycerol, ethanol, methanol, pentaerythritol, iso-propanol, isopropyl alcohol, butanol, dihydroxy butanol, or any other mono-functional or multi-functional alcohol a varying long-chain aliphatic hydrocarbon backbone.

Petroleum derived waxes are comprised of one or more member selected from the group consisting of saturated n-alkanes, iso-alkanes, napthenes, alkyl-substituted aromatic compounds, and napthene-substituted aromatic compounds. Synthetic waxes can be polyethylene, Fischer-Tropsch waxes, chemically modified waxes, or amide modified waxes. Polyethylene waxes generally have the chemical formula (C2H4)nH2 and are comprised, based on branching and chemical structure, of one or more component of the group consisting of ultra-high-molecular-weight polyethylene (UHMWPE), high-density polyethylene (HDPE), cross-linked polyethylene (PEX or XLPE), medium-density polyethylene (MDPE), linear low-density polyethylene (LLDPE), low-density polyethylene (LDPE), very-low-density polyethylene (VLDPE), and copolymers. Fischer-Tropsch waxes generally have the chemical formula (CnH(2n+2)).

Chemically modified waxes are converted from non-polar to polar molecules by the incorporation of a functional chemical group comprised of one or more component consisting of a hydroxyl group, a carboxyl group, a salt, an ester group, and an acid group. Amide modified waxes are chemically modified waxes that have amide functional molecules grafted to the polyethylene molecule to modify flexibility, adhesion, or system compatibility of the wax.

Plasticizers are comprised of one or more member selected from the group consisting of vegetable oils, synthetic alkyd oils, and phthalates. Vegetable oils, called triglycerides because they are the resultant reaction of fatty acids with glycerol, and synthetic alkyd oils are made of fatty acid esters of varying composition. The fatty acids found in their structure are comprised of one or more components of the group consisting of ricinoleic acid, oleic acid, linoleic acid, linolenic acid, stearic acid, palmitic acid, dihydroxy stearic acid, myristic acid, myristoleic acid, palmitoleic acid, sapeinic acid, elaidic acid, vaccenic acid, alpha-linolenic acid, arachidonic acid, eicosapentaenoic acid, erucic acid, docosahexaenoic acid, caprylic acid, capric acid, lauric acid, arachidic acid, behenic acid, lignoceric acid, and cerotic acid. Phthalates are comprised of one or more components from the group consisting of dimethyl phthalate, diethyl phthalate, diallyl phthalate, di-n-propyl phthalate, di-n-butyl phthalate, diisobutyl phthalate, butyl cyclohexyl phthalate, di-n-pentyl phthalate, dicyclohexyl phthalate, butyl benzyl phthalate, di-n-hexyl phthalate, diisohexyl phthalate, diisoheptyl phthalate, butyl decyl phthalate, butyl(2-ethylhexyl) phthalate, di(n-octyl) phthalate, diisooctyl phthalate, n-octyl n-decyl phthalate, diisononly phthalate, di(2-prpoylheptyl) phthalate, diisodecyl phthalate, diundecyl phthalate, diisoundecyl phthalate, ditridecyl phthalate, and diisotridecyl phthalate.

The hydrocarbon based thermoplastic binder is comprised of one or more components selected from the group consisting of hydrocarbon resins, rosin resins, waxes, and plasticizers. The hydrocarbon resin is comprised of one or more component selected from the group consisting of C5 aliphatic hydrocarbon resins, C9 aromatic hydrocarbon resins, and C5/C9 hydrocarbon blend. C5 aliphatic hydrocarbon resins are produced from the distillation reaction, in the presence of a Lewis catalyst, of piperylene which is comprised of one or more components of the group consisting of trans-1,3-pentadiene, cis-1,3-pentadiene, 2-methyl-2-butene, dicyclopentadiene, cyclopentadiene, and cyclopentene.

C9 aromatic hydrocarbon resins are a byproduct of the naptha cracking of petroleum feedstocks used to produce C5 aliphatic resins and are comprised of one or more components of the group consisting of vinyltoluenes, dicyclopentadiene, indene, methylstyrene, styrene, and methylindenes.

The rosin resin is comprised of one or more component selected from the group consisting of modified rosin resins and rosin esters. Modified rosin resins are comprised of one or more component selected from the group consisting of rosin acids, maleic anhydride, and fumaric acid. Rosin acids, derived from pine trees as gum rosin, wood rosin, or tall oil rosin, are comprised of one or more component of the group consisting of abeitic acid, neoabeitic acid, dehydroabeitic acid, levopimaric acid, pimaric acid, palustric acid, isopimaric acid, and sandarocopimaric acid. Rosin esters are comprised of one or more derivative obtained from the reaction of one or more rosin acids and one or more alcohol from the group of alcohols consisting of methanol, triethylene glycol, glycerol, and pentaerythritol.

The waxes used in the hydrocarbon based binder system are comprised of one or more components selected from the group consisting of petroleum waxes or synthetic waxes. Petroleum derived waxes are comprised of one or more member selected from the group consisting of saturated n-alkanes, iso-alkanes, napthenes, alkyl-substituted aromatic compounds, and napthene-substituted aromatic compounds. Synthetic waxes can be polyethylene, Fischer-Tropsch waxes, chemically modified waxes, or amide modified waxes.

Polyethylene waxes generally have the chemical formula (C2H4)nH2 and are comprised, based on branching and chemical structure, of one or more component of the group consisting of ultra-high-molecular-weight polyethylene (UHMWPE), high-density polyethylene (HDPE), cross-linked polyethylene (PEX or XLPE), medium-density polyethylene (MDPE), linear low-density polyethylene (LLDPE), low-density polyethylene (LDPE), very-low-density polyethylene (VLDPE), and copolymers. Fischer-Tropsch waxes generally have the chemical formula (CnH(2n+2)).

Chemically modified waxes are converted from non-polar to polar molecules by the incorporation of a functional chemical group comprised of one or more component consisting of a hydroxyl group, a carboxyl group, a salt, an ester group, and an acid group. Amide modified waxes are chemically modified waxes that have amide functional molecules grafted to the polyethylene molecule to modify flexibility, adhesion, or system compatibility of the wax.

The plasticizers used in the hydrocarbon binder system are comprised of one or more member selected from the group consisting of process oils and phthalates. Process oils are comprised of one or more components of the group consisting of paraffinic oils, napthenic oils, and aromatic oils. All of the process oils are derived from the petroleum refining industry as distillates and are separated based on degree of carbon-carbon saturation.

Paraffinic oils are saturated carbon backbones, napthenic oils have polyunsaturated carbon structure with little aromatic content, and aromatic oils have cyclic carbon unsaturation resulting aromatic classification. Phthalates are comprised of one or more components from the group consisting of dimethyl phthalate, diethyl phthalate, diallyl phthalate, di-n-propyl phthalate, di-n-butyl phthalate, diisobutyl phthalate, butyl cyclohexyl phthalate, di-n-pentyl phthalate, dicyclohexyl phthalate, butyl benzyl phthalate, di-n-hexyl phthalate, diisohexyl phthalate, diisoheptyl phthalate, butyl decyl phthalate, butyl(2-ethylhexyl) phthalate, di(n-octyl) phthalate, diisooctyl phthalate, n-octyl n-decyl phthalate, diisononly phthalate, di(2-prpoylheptyl) phthalate, diisodecyl phthalate, diundecyl phthalate, diisoundecyl phthalate, ditridecyl phthalate, and diisotridecyl phthalate.

The pigment can be Rutile Type II titanium dioxide with a minimum purity of 92% for white materials and a combination of titanium dioxide and organic or other heavy metals free yellow pigments for yellow materials. The fillers are ground calcium carbonate of various particle size based on desired flow characteristics. The glass beads used shall be the size, quality, and concentration specified by the applicable governmental requirement.

In one the preferred embodiments, the alkyd binder comprises a mixture of maleic modified glycerol ester and pentaerythritol ester of rosin resins, high density polyethylene or other acid or amine functional high density polyethylene waxes, low density copolymer of polyethylene thermoplastic elastomers, and synthetic or natural, solid or liquid plasticizers based soya, castor, or palm chemistries.

The hydrocarbon binder prepared according to the instant invention comprises a blend of petroleum based C-5 resins (tackifiers), pentaerythritol or maleic modified ester of rosin resin, low density polyethylene wax/elastomer, an acid or amine functional based low density polyethylene, high density polyethylene waxes (HDPE), and a paraffinic, napthenic oil used as a liquid plasticizer. The pigment used in the road marking composition of this invention can be Rutile Type II titanium dioxide with a minimum purity of 92% for white materials and a combination of titanium dioxide and organic or other heavy metals free yellow pigments for yellow materials. The fillers used in the composition of the instant invention are ground calcium carbonate of various particle size based on desired flow characteristics. The glass beads used in the instant composition depend on the applicable governmental requirement for the size, quality, and concentration.

In the preferred embodiments, white alkyd-based binder mixture contains between 8% and 16% by weight of rosin resin with a melt point of between 95° and 110° C., between 0.01% and 3% by weight of wax with a melting point of between 95° and 115° C., and a non-drying polar material plasticizer in the amount of between 0.01% and 3% by weight. The total binder mixture present in the road marking composition is between 18% and 26% by weight.

Example 1

One specific example of a white alkyd-based binder mixture contains 13.6% by weight of a rosin resin, 2.5% by weight of wax, and 1.9% by weight of a plasticizer. Total binder weight is 19%.

In the preferred embodiments, white filler mixture for alkyd-based binder contains titanium dioxide (Rutile Type II) of 92% minimum purity in the amount of between 10% and 12% by weight, AASHTO Type I Glass Beads 70% Rounds Minimum in the amount of between 30% and 40% by weight, and Ground Calcium Carbonate+/−325 Mesh in the amount of between 34% and 42% by weight.

Example 1-1

In one specific example, the white filler mixture for the alkyd-based composition comprises about 10% by weight of titanium dioxide, about 30% by weight of AASHTO Type I Glass Beads, and about 41% of calcium carbonate. The softening point of the binder and the filler, in the preferred embodiment, is about 104.44° C.

In the preferred embodiments, yellow-tinted alkyd-based binder mixture contains the same ingredients as the white alkyd-based binder. However, the pigment mixture is different. The filler mixture for a yellow-tinted alkyd-based binder contains titanium dioxide in the amount of between 0.5% and 3% by weight, AASHTO Type I Glass Beads 70% Rounds Minimum in the amount of between 30% and 40% by weight, organic or lead-free yellow pigment in the amount of between 0.25% and 1.25% by weight, organic or lead-free heat-resistant orange in the amount of 0.05% to 0.25% by weight, and a sufficient amount of Ground Calcium Carbonate+/−325 Mesh to constitute 100% of the road marking composition. The softening point of the binder and the filler, in the preferred embodiment, is about 104.44° C.

Example 1-2

In one example, the yellow filler mixture for alkyd-based binder contains 1.5% by weight of titanium dioxide, about 0.5% by weight of Organic Yellow 83 pigment, 0.05% by weight of lead-free orange pigment, about 30% by weight of AASHTO Type I Glass Beads 70% Rounds Minimum, and about 49% by weight of ground calcium carbonate.

In an exemplary embodiment of the composition of the thermoplastic road marking material prepared according to the method of the present invention, the alkyd-based binder comprises maleic modified alkyd resin in the amount of between 8% and 16% by weight, pentaerythritol (PE) alkyd resin in the amount of between 0.01% and 7% by weight, high density polyethylene (HDPE) or similar wax in the amount of between 0.01% and 3%, an elastomer in the amount of between 0.25% and 3%, and a plasticizer in the amount of between 0.01% and 3%. The plasticizer can be liquid, solid, or paste.

In the preferred embodiments of the alkyd-base binder, maleic modified alkyd resin has a melting point of between 95° and 110° C., pentaerythritol (PE) alkyd resin has a melting point of between 95° and 110° C., high density polyethylene (HDPE) or similar wax has a melting point of between 95° and 115° C., elastomer has a melt flow index of between 0 and 1000, and the plasticizer is a non-drying polar material.

Example 1-3

In one specific example, the alkyd-based binder mixture comprises 13.6% by weight of maleic modified alkyd resin, 2.5% by weight of high density polyethylene, 1% by weight of elastomer and 1.9% by weight of a plasticizer. Pentaerythritol (PE) alkyd resin is an optional ingredient in this particular example.

The binder mixture is present in the finished composition in the amount of between 18% and 26% by weight. In the specific example above, the binder total is about 19% by weight. To the binder mixture, a filler mixture is added to make up 100% by weight of the road marking materials.

The present invention further contemplates provision of a hydrocarbon-based road marking composition. In such compositions, the petroleum-based binder comprises between 10 and 15% by weight of a hydrocarbon resin with a melt point of between 95° and 110° C., between 0.01% and 3% by weight of rosin resin with a melt point of 95° and 110° C., between 0.01% and 3% of a wax with a melt point of 95° and 115° C., and between 0.01% and 2% by weight of a plasticizer, such as White Oil or similar substance. The total binder present in the finished petroleum-based road marking composition is between 18% and 26% by weight. White filler mixture for the petroleum-based binder is similar to the white filler mixture for the alkyd-based binder mixture.

Example 2

One exemplary embodiment of a petroleum-based binder contains about 10.3% of a hydrocarbon resin, about 2.5% by weight of a rosin resin, about 2.5% by weight of a wax, and about 1.2% by weight of a plasticizer, with a total weight of the binder being about 19% of the total composition.

In the preferred embodiments, the hydrocarbon based binder mixture contains a petroleum-based resin, such as for instance C-5 or C-9 resin in the amount of between 10% and 15% by weight, pentaerythritol (PE) alkyd resin in the amount of between 0.01% and 3% by weight, high density polyethylene (HDPE) or similar wax in the amount of between 0.01% and 3% by weight, low density polyethylene (LDPE) in the amount of between 0.01% and 3% by weight, functionalized low-density polyethylene in the amount of between 0.01% and 0.25% by weight, and a plasticizing oil (white oil or similar agent) in the amount of between 0.01% and 2% by weight. The total amount of binder in the exemplary petroleum-based compositions is between 18% and 26% by weight.

In the preferred embodiments of the hydrocarbon-based binder, C-5 resin has a melting point of between 95° and 110° C., pentaerythritol (PE) alkyd resin has the melting point of between 95° and 110° C., high density polyethylene (HDPE) or similar wax has the melting point of between 95° and 115° C., low-density polyethylene and functionalized LDPE each have a melt flow index of between 0 and 1000, functionalized LDPE has a melt and the plasticizing oil is a non-drying polar material.

Example 2-1

In one specific example of the petroleum-based binder mixture, the composition has 10.3% by weight of C-5 resin, 2.5% by weight of PE alkyd resin, 2.5% by weight of HDPE, 2.5% by weight of LDPE, and 1.2% by weight of white Oil. Functionalized LDPE is an optional ingredient in this particular example. The binder is present in this specific example in the amount of 19% by weight.

Example 2-2

In another example of a petroleum-based binder mixture, the composition has 11.3% by weight of C-5 resin, 2.5% by weight of PE alkyd resin, 2.5% by weight of HDPE, 2.5% by weight of LDPE, and 1.2% by weight of white Oil. Functionalized LDPE is an optional ingredient in this particular example. The binder is present in this specific example in the amount of 20% by weight.

The white tinting filler mixture for the petroleum-based binder is similar to the filler mixture of the alkyd base composition inasmuch as it uses titanium dioxide, glass beads and calcium carbonate. In the preferred embodiments, the white filler mixture for the hydrocarbon-based binder contains titanium dioxide (Rutile Type II) of 92% minimum purity in the amount of between 10% and 12% by weight, AASHTO Type I Glass Beads 70% Rounds Minimum in the amount of between 30% and 40% by weight, and Ground Calcium Carbonate+/−325 Mesh in the amount of between 34% and 42% by weight. The filler mixture is added in sufficient amount to the binder mixture to make up 100% of the composition.

Example 2-3

In one specific example, white-tinted filler mixture for the petroleum-based binder comprises about 10% by weight of titanium dioxide, about 30% by weight of AASHTO Type I Glass Beads, and about 41% by weight of calcium carbonate. The softening point of the binder and the filler, in the preferred embodiment, is about 104.44° C.

The filler mixture for a yellow-tinted hydrocarbon-based binder contains titanium dioxide in the amount of between 0.5% and 3% by weight, AASHTO Type I Glass Beads 70% Rounds Minimum in the amount of between 30% and 40% by weight, organic or lead-free yellow pigment in the amount of between 0.25% and 1.25% by weight, organic or lead-free heat-resistant orange in the amount of 0.05% to 0.25% by weight, and a sufficient amount of Ground Calcium Carbonate+/−325 Mesh to make up 100% of the road marking composition.

Example 2-4

In one specific example, a yellow-tinted filler mixture for the petroleum-based binder comprises about 1.00% by weight of titanium dioxide, about 30% by weight of AASHTO Type I Glass Beads, 0.6% by weight of Organic Yellow 83, 0.05% by weight of Lead-free Orange pigment, and about 48.4% by weight of calcium carbonate. The softening point of the binder and the filler, in the preferred embodiment, is about 104.44° C.

Raw material components processed in the apparatus 10 in making road marking composition according to this invention are received in bulk powder, bulk liquid, super sack powder, super sack flake, super sack pellet, super sack prill, bag powder, bag flake, bag pellet, or bag prill form.

The containers 22 with the raw materials are mounted on a superstructure 30, below which an extruder assembly is located. Raw material from each weight load cell 26 is dispensed, by gravity to an auger mixer assembly or extruder assembly 32. Some of the more sensitive components of the mixture of raw materials are fed into the auger mixer assembly 32 downstream from an upstream intake end 34, as is schematically shown by arrows 36 in FIG. 1. In one aspect of the invention, the auger mixer assembly 32 comprises a co-rotating twin screw extruder.

All binder components except liquid plasticizers are metered into the extruder in conjunction with all titanium dioxide and ½ of the filler as the extruder screw(s) rotate and propagate material flow down the extruder barrel 40. The screw extruders or augers 42 mix the components into a homogenous mixture, which is transported along the extruder barrel 40, within which the auger 42 rotates.

The extruder's barrel 40 is heated by friction and/or with electric heater bands 46 or cooled with pumped water (via a water jacketed barrel) as desired or required by the material being produced. The first section of the extruder (the feed section) 34 is used to feed the initial components into the mixing and kneading section of the screw 42 where the rest of the filler and glass beads and any liquid plasticizers are introduced according to the formulation's required rate. The initial components are melted into a liquid form at a temperature of 137.78° C. at the point of union with the secondary raw material addition. All materials are blended and heated further in the mixing and kneading section of the auger 42 until they are homogenous and reach a temperature of 148° C.

It is envisioned that the system 10 may use one or more heating/cooling devices 46. The heating device causes the temperature of the mixture to rise to at least 148° C. in order to provide sufficient energy and binder mobility for complete system homogenization, pigment wetting, and color development. The heating devices 46, which form a part of the mixing station are configured to melt the dry ingredients and form a homogenous molten compound.

Rotations of the auger 42 force the material flow into the cooling station where the material is cooled to between 121° C. and 135° C. The material's melting and mixing temperatures can vary depending on formulation and end use. Low viscosity, high binder products such as spray materials and 40-mil materials might be processed at temperature of 121° C. and extruded at temperature of between 93° C. and 107° C. A high viscosity, molecularly robust product may be heated to a temperature of between 176° C. and 204° C. and extruded at temperature of between 135° C. and 148° C.

The mixing station 12 comprises a pellet cutting member 50, which receives the molten homogenous compound from the conduit 40. The cutting member 50 may contain a plurality of cutting blades, which intercept the molten flow and cut it into individual pellets using rotating precision cut dies. In one preferred embodiment, the apparatus 10 comprises dies with six (6) to twelve (12), 4 mm diameter openings arranged in a circular pattern around the perimeter of an extrusion die. The cutting member 50 cuts the liquefied plastic and extrudes them into a water bath of the cooling station 14. The water bath can be in the form of a tube 52 formed integrally with the cutter head of the cutting member 50. The water provides a means for transporting the pellets from the cutter head to a sifter (which may include a centrifuge) for separation of the pellets from the water, where the water is separated and re-circulated back. The water also cools the pellets and causes solidification of the pellets. The solid pellets can be between 4 mm and 6.5 mm in size in the shape of small cylinders, fixed length cylinders that are now pellets, particles, or drops of solid, homogenous, thermoplastic road marking material. In one exemplary embodiment, when the melted pavement marking mixture is cooled below 46° C. it solidifies and hardens.

As the material exits the extruder and die, it flows into a continuously flowing water stream that can be heated and cooled to improve pellet integrity, which is entirely formulation dependent. The water's throughput rate, velocity, and temperature as well as the total water in the system can vary and is designed as a function of the system's rated production capacity per hour.

An extruder control unit 90 is operationally connected to the auger extruder assembly 32 via suitable cables 92; the control unit 90 forms a part of the extruder mixer assembly 32. The extruder control unit 90 is configured to control zone temperature, rotational speed of the auger 42, as well as the feed rate of the raw materials into the auger mixer assembly 32. The control unit 90 is in operational communication with sensors 94 that measure screw torque, screw speed, energy consumption, zone temperature, flow rate, material temperature and system pressure.

The water is re-circulated through the system using a closed loop conduit 54. A circulating pump is mounted in the loop conduit 54 to facilitate movement of water through the cooling section 14. The flow of water is controlled by a control unit 100, which provides temperature control and flow rate. The control unit 100 processes signals received from various sensors mounted in the cooling station 14 and issues control command to the pump and the heating member(s) 46.

A sieve or sifter assembly 60 is mounted at the junction of the cooling station 14 and the drying station 16. The sifter assembly 60 allows water to drop by gravity, while the solid pellets 68 are carried onto a fluidized bed or conveyor 70 of the drying station 16. The force of water flow propels the cut material upward through piping where the pelletizing apparatus separates the pellets from the water and deposits them onto an air-fed fluidized bed 70 for drying. The bed is angled slightly away from the pellet source toward the pellet coating station 18 so that the force of gravity can move the material through the process. As an alternative, the material can be dried using a centrifugal dryer, which eliminates the need for the fluidized bed and the pellets would move via vibrating table directly into the pellet coating station. Air flow moves through the bed surface via numerous small air holes, and the rate of flow is adjusted so that the force "floats" the material pieces, effectively making them weightless so that they move slowly down the angled bed and into the pellet coating station.

The fluidized bed 70 can be formed as a conveyor, which is exposed to a flow of drying air schematically illustrated by arrows 72 in FIG. 1. The solid pellets carried by the conveyor 70 are exposed to a continuous flow of dry air causing evaporation of any remaining liquid from the pellet surface. As the vapor 74 rises from the pellets 68, the pellets 68 become dry even as they are transported to a rotating pellet coating vessel 76.

The pellet coating barrel or vessel 76 is mounted below a coating container 78, which houses a pellet coating material. A weight loss load cell 80 is operationally connected to the coating container 78 in order to regulate delivery of the pellet-coating material to the pellet coating vessel 76. The pellet coating material can be a member selected from a group containing kaolin clay, calcium carbonate, calcined clay, micronized waxes and other anti-clumping materials or a combination of materials.

The pellet coating station 18 is utilized to modify the surface of the pellets so that they will remain free flowing after packaging and storage. The free flowing nature of the material is necessary for ease of use during application. The pelletized material is deposited into a smooth walled, rotating barrel 76 with an angled axis inclined toward the pellet source leaving the fluidized bed 70 for vibratory table. As the material falls into the rotating barrel 76, the coating agent is metered from the coating container into the barrel at a flow rate controlled by the control unit in the form of the weight loss cell 80. As an alternative, the pellets can be coated by suspending the pellet coating as solution in the water used to cool and transport the material.

The coated pellets 82 are unloaded from the barrel 76 into a packaging and/or shipping container 84, which can be in the form of a transportable drum. In one exemplary embodiment, when the material in the rotating barrel 76 reaches levels sufficient to overflow the barrel 76, the surface treated particles "spill" into finished goods packaging or into another storage vessel that can be used to dispense the finished product into packaging or various sizes or bulk storage. Finished goods packaging can range in size from five-gallon containers holding approximately 22 kg of material to Gaylord boxes containing approximately 907 kg-997 kg to super sacks containing up to 1587 kg to bulk storage devices that can hold up to 19958 kg. The bulk storage device can be used to ship material in bulk and stored in bulk bins at the customer's location.

The road marking mix pellets packaged in the drums 84 are shipped to the site, where road markings need to be applied. The pellets are melted using conventional equipment and then extruded directly onto the road surface. The solid pellets produced by the system of the present invention save time and energy during a road marking process. The pellets are easily transported and deposited into the convention road marking machines, where they are melted, while retaining their homogenous characteristics.

The composition of the materials processed into pellets generally follows government specification set forth in AASHTO M249-09. Each state or project could have special requirements or variations of this specification, but they usually reference this specification with changes. The specification provides compositional requirements and melt/flow characteristics. Things that could change are the Color Box or CIE color coordinates for yellow materials. Additionally, supplemental specification LADOTD 1015.10 can be used. The pellets can differ in size, pigment, as well as refractive index depending on the type and ratio of ingredients of the raw material mix.

The road marking mix may employ higher binder (25% or more), specialty application (audible and audible inverted), and applied by spray, ribbon extrude, spray extrude, screed extrude application techniques. Regardless of material or application, it will still meet the compositional requirements in the government specification M249-09.

The method of the present invention allows creation of a pavement marking material that has substantially less dust because the finished product is a solid, homogenous dust free product. The pavement marking composition produced by the method of the present invention is homogenized during manufacturing, thereby producing compositionally identical particles. Having particles that are identical allows for increased process control and monitoring. Theoretically, one particle can be tested for composition and physical properties due to the homogenous nature of the finished product. Smaller samples can be taken with greater certainty of testing accuracy.

Since the method produces homogenous mixture during the mixing and melting stages, each particle produced will be compositionally identical, which will yield more reliable and repeatable test results. The strict temperature control allows improved consistency of the final product. Additionally, when compared to conventional processes using a "buffer" of raw materials added to ensure that the finished material passes independent laboratory testing for composition, the pellets produced in the instant system do not require the "buffer," which leads to significant cost reduction in raw materials and optimization of the formulation.

Because all materials are melted into the final product, raw materials can be purchased and added as a liquid, solid, powder, or paste form. The pelletized material can be produced at lower temperatures (149° C.+/−4° C.) in comparison to the conventional block process (177° C.+/−4° C.). The production process does not require a "batching" process so there is no break or time loss between batches as seen in the "dry blend" or "block" processes. Material cooling after particle formation is accelerated by the lower initial temperature and faster cooling rate. The cooling rate is a function of surface area. The pellet process yields material with much higher surface area than the "block" process, resulting in more efficient cooling.

The pellets produced in accordance with the present invention have superior storage stability. The pellets or particles are in the same physical form that is placed on the highway as an exterior, UV and weather resistant coating. Therefore, the pellets can withstand exposure to moisture, heat, humidity for longer periods than the current products on the market. Conventional "dry blend" products are produced in a powder form that will absorb moisture and become a solid compressed block over a long storage time. Moisture content causes increased energy to vaporize the moisture and the increased energy and heat will also cause color and physical property degradation. When the material becomes compressed the melt time, energy consumed, and labor requirement is greatly increased. "Block" material can withstand moisture as well, but the boxes that it is packaged in can get wet and become a nuisance and efficiency killer for crews. Generally, thermoplastic is considered to have a one-year storage life when stored indoors, away from direct contact with water. The pellet materials produced according to this invention could see that longevity at least doubled.

It is envisioned that the pellets 82 can be used in conventional melt vessels and application operations, as well as "tankless" application operations. In a "tank less" process, no material would be heated in melt vessels or kettles. The pellets or particles would be added manually, pneumatically, or by other automatic or semi-automatic conveyance to a system of pipes and extruders capable of heating the material "on demand" and without any preheating.

Many changes and modifications can be made in the system of the present invention without departing from the spirit thereof. I, therefore, pray that my rights to the present invention be limited only by the appended claims.

We claim:

1. A process of making road marking material, comprising the steps of:
   a. admixing a pre-determined quantity of a binder mixture comprising rosin resins, waxes, and plasticizers with a filler mixture comprising reflective elements;
   b. heating the binder mixture with the filler mixture, while mixing, into a homogenous viscous molten composition;
   c. subjecting the molten composition to an extrusion process;
   d. cutting extruded molten composition into a plurality of individual pellets;
   e. cooling and drying the individual pellets; and
   f. applying an anti-clumping coating to the individual pellets.

2. The method of claim 1, comprising a step of adding a pre-determined quantity of hydrocarbon-based resin during the step of mixing the binder mixture with the filler mixture.

3. The method of claim 1, wherein the binder mixture comprises between 8% and 16% by weight of rosin resin with a melt point of between 95° and 110° C., between 0.01% and 3% by weight of wax with a melt point of between 95° and 115° C., and a non-drying plasticizer in the amount of between 0.01% and 3% by weight.

4. The method of claim 2, wherein the binder mixture comprises between 10% to 15% by weight of hydrocarbon resin, between 0.05% and 3% by weight of rosin resin, between 0.05% and 3% by weight of wax, and 0.05% and 2% by weight of plasticizer.

5. The method of claim 1, wherein the filler mixture comprises titanium dioxide in the amount of between 10% and 12% by weight, reflective elements in the amount of between 30% and 40% by weight, and ground calcium carbonate in the amount of between 34% and 42% by weight.

6. The method of claim 1, wherein the filler mixture comprises titanium dioxide in the amount of between 0.5% and 3% by weight, reflective elements in the amount of between 30% and 40% by weight, a yellow pigment in the amount of between 0.25% and 1.25% by weight, an orange pigment in the amount of 0.05% to 0.25% by weight, and a sufficient amount of ground calcium carbonate to constitute 100% of the road marking composition when mixed with the binder mixture.

7. The method of claim 1, wherein the modified rosin resins comprise rosin acids, maleic anhydride, and fumaric acid, and wherein the rosin acids comprise one or more member selected from the group consisting of abeitic acid, neoabeitic acid, dehydroabeitic acid, levopimaric acid, pimaric acid, palustric acid, isopimaric acid, and sandarocopimaric acid.

8. The method of claim 1, wherein the rosin esters are comprised of one or more derivative obtained from the reaction of one or more rosin acids and one or more alcohol from the group of alcohols consisting of methanol, triethylene glycol, glycerol, and pentaerythritol.

9. The method of claim 1, wherein the waxes are selected from the group consisting of vegetable waxes, petroleum derived waxes, and synthetic waxes.

10. The method of claim 9, wherein the vegetable waxes comprise mixtures of long-chain aliphatic hydrocarbons containing esters of fatty acids and alcohols.

11. The method of claim 10, wherein the fatty acids are comprised of one or more member selected from the group consisting of ricinoleic acid, oleic acid, linoleic acid, linolenic acid, stearic acid, palmitic acid, dihydroxy stearic acid, myristic acid, myristoleic acid, palmitoleic acid, sapeinic acid, elaidic acid, vaccenic acid, alpha-linolenic acid, arachidonic acid, eicosapentaenoic acid, eurcic acid, docosahexaenoic acid, caprylic acid, capric acid, lauric acid, arachidic acid, behenic acid, lignoceric acid, and cerotic acid.

12. The method of claim 10, wherein the alcohols are comprised of one or more member selected from the group consisting of glycerol, ethanol, methanol, pentaerythritol, isopropanol, isopropyl alcohol, butanol, dihydroxy butanol, and an alcohol having a varying long-chain aliphatic hydrocarbon base.

13. The method of claim 9, wherein the petroleum derived waxes are comprised of one or more member selected from the group consisting of saturated n-alkanes, iso-alkanes, napthenes, alkyl-substituted aromatic compounds, and napthene-substituted aromatic compounds.

14. The method of claim 9, wherein the synthetic waxes comprise polyethylene waxes, Fischer-Tropsch waxes, chemically modified waxes, and amide modified waxes.

15. The method of claim 14, wherein the polyethylene waxes comprise ultra-high-molecular-weight polyethylene, high-density polyethylene, cross-linked polyethylene, medium-density polyethylene, linear low-density polyethylene, low-density polyethylene, very-low-density polyethylene, and copolymers.

16. The method of claim 14, wherein the Fisch-Tropsch waxes comprise an agent having a chemical formula of $CnH(2n+2)$.

17. The method of claim 1, wherein the chemically modified waxes comprise one or more member selected from the group consisting of a hydroxyl group, a carboxyl group, a salt, an ester group, and an acid group.

18. The method of claim 1, wherein the plasticizers are comprised of one or more member selected from the group consisting of vegetable oils, synthetic alkyd oils, and phalates.

19. The method of claim 18, wherein the vegetable oils comprise fatty acids selected from the group consisting of ricinoleic acid, oleic acid, linoleic acid, linolenic acid, stearic acid, palmitic acid, dihydroxy stearic acid, myristic acid, myristoleic acid, palmitoleic acid, sapeinic acid, elaidic acid, vaccenic acid, alpha-linolenic acid, arachidonic acid, eicosapentaenoic acid, erucic acid, docosahexaenoic acid, caprylic acid, capric acid, lauric acid, arachidic acid, behenic acid, lignoceric acid, and cerotic acid.

20. The method of claim 18, wherein the phthalates are comprised of one or more member selected from the group consisting of dimethyl phthalate, diethyl phthalate, diallyl phthalate, di-n-propyl phthalate, di-n-butyl phthalate, diisobutyl phthalate, butyl cyclohexyl phthalate, di-n-pentyl phthalate, dicyclohexyl phthalate, butyl benzyl phthalate, di-n-hexyl phthalate, diisohexyl phthalate, diisoheptyl phthalate, butyl decyl phthalate, butyl(2-ethylhexyl) phthalate, di(n-octyl) phthalate, diisooctyl phthalate, n-octyl n-decyl phthalate, diisononyl phthalate, di(2-prpoylheptyl) phthalate, diisodecyl phthalate, diundecyl phthalate, diisoundecyl phthalate, ditridecyl phthalate, and diisotridecyl phthalate.

21. The method of claim 2, wherein the hydrocarbon resin is one or more member selected from the group consisting of C-5 aliphatic hydrocarbon resins, C-9 aromatic hydrocarbon resins, and a mixture thereof.

22. The method of claim 21, wherein the C-5 aliphatic hydrocarbon resins comprise trans-1,3-pentadiene, cis-1,3-pentadiene, 2-methyl-2-butene, dicyclopentadiene, cyclopentadiene, and cyclopentene.

23. The method of claim 22, wherein the C-9 aromatic hydrocarbon resins comprise vinyltoluenes, dicyclopentadiene, indene, methylstyrene, styrene, and methylindenes.

* * * * *